United States Patent Office 2,706,184
Patented Apr. 12, 1955

2,706,184

RUBBER PROCESSING COMPOSITIONS

Walter A. Schulze, Bartlesville, Okla., assignor to Phillips Petroleum Company, a corporation of Delaware No Drawing. Original application August 15, 1949, Serial No. 110,479, now Patent No. 2,659,677, dated November 17, 1953. Divided and this application November 8, 1951, Serial No. 255,518

16 Claims. (Cl. 260—27)

This invention relates to rubber processing compositions. In one embodiment it relates to a composition comprising liquid polymers of a conjugated diolefin and a rosin acid. In one specific embodiment this invention relates to novel rubber processing compositions made of liquid polymers of butadiene and rosin acid.

This application is a division of my copending application Serial No. 110,479 filed August 15, 1949 (now U. S. Patent 2,659,677).

In the manufacture of rubber products, compounding and processing have become complicated by the numerous additive agents which are required to impart the desired properties to the finished articles. It is generally necessary that a softener or plasticizer be present, as well as other substances, which will aid the vulcanization process. For the latter purpose, an organic acid is one of the material frequently employed. Substances which improve tensile strength, tack, abrasion resistance, and control the cure are also considered essential in many instances. In the processing of natural rubber scorching has been one of the difficulties encountered and additive agents which will effect improvements in this respect are highly desirable. It is known that certain advantages are gained through the presence of rosin acid in rubber products but the incorporation of rosin acid into polymeric materials presents numerous difficulties. It is difficult to incorporate rosin acid into rubber on the mill. In the production of synthetic rubber, an alkali metal salt of rosin acid is frequently employed as the emulsifying agent for carrying out polymerization reactions, but its use in this capacity is limited since it is not applicable in some polymerization recipes, particularly at low temperatures. Rosin soap may be added to the latex and after coagulation rosin acid will remain in the product. This method, which requires an alkali to convert the acid to the corresponding salt and an acid to convert the salt back to the rosin acid during coagulation of the latex, is obviously not economical but it has afforded a means of producing rosin acid rubber.

I have now discovered novel rubber processing compositions which furnish a convenient and economical method for incorporating rosin acid directly into rubber on the mill and which simultaneously provides the acid necessary for vulcanization together when the softening or plasticizing agent, the latter being in itself vulcanizable. These compositions, which are hereinafter referred to as vulcanizable plasticizer compositions, are prepared from a low molecular weight or liquid butadiene polymer and rosin acid. With the discovery of the rubber processing materials of this invention, much less complicated compounding recipes than those heretofore employed are made possible, since a single composition which performs several functions is used instead of a number of different ingredients, each of which must be added in a definite quantity.

It is an object of this invention to provide rubber processing compositions comprising a liquid polymer of a conjugated diolefin and a rosin acid, said compositions being employed to improve the processability of rubber and rubber-like polymers.

Another object is to provide vulcanizable plasticizer compositions to improve the processability of rubber and rubber-like materials, said compositions comprising a product obtained by the reaction of a liquid polymer of a conjugated diolefin with rosin acid.

Still another object is to provide rubber products of improved properties by a process which comprises the incorporation of vulcanizable plasticizer compositions therein, said compositions comprising a reaction product of a liquid polymer of butadiene and rosin acid.

Still another object of this invention is to provide a process for the production of improved rubber and rubber-like materials containing rosin acid wherein the rosin acid is incorporated into said rubber and rubber-like materials by the use of novel vulcanizable plasticizer compositions.

Further objects and advantages of this invention will be apparent to one skilled in the art from the accompanying disclosure and discussion.

The foregoing objects apply, collectively and severally, to natural rubber and to various synthetic rubbers. The term "rubber" herein when used alone, without reference to either natural rubber or synthetic rubber, is intended to generically represent both natural rubber and synthetic rubber. Another generic term that has been applied to these materials is "a vulcanizable organic plastic substance containing unsaturated carbon to carbon bonds."

The butadiene polymer-rosin acid compositions of this invention are powerful plasticizers as evidenced by their effect on difficultly processable synthetic elastomers. A rubber polymeric material having a high Mooney value can be softened readily through the incorporation of these additive agents and the processing characteristics are greatly improved. These novel compositions, also, act as cure retarders, thus making it possible to overcome deleterious effects which result in some instances from too rapid cure. The effects on scorch characteristics are especially important, particularly in the processing of natural rubber. Indeed one of the important advantages of the additive compositions herein described is their action as scorch retarders. Another advantage is the improvement in abrasion resistance which is shown in both natural and synthetic rubber stocks.

The vulcanizable plasticizer compositions of this invention are prepared from a low molecular weight butadiene polymer and rosin acid. They are homogeneous materials which vary in viscosity from very viscous or semi-solid substances to fluid compositions depending upon the viscosity of the butadiene polymer and the proportion of butadiene to rosin acid employed. The proportions of the ingredients may be varied over broad ranges to give compositions which are readily incorporated into rubber on the mill.

The polymers employed in the preparation of the additive agents are referred to as butadiene polymers and this term includes polymers of 1,3-butadiene, which is the preferred species, and various other conjugated diolefins which may be considered as substituted 1,3-butadienes. Examples of other diolefins include isoprene, piperylene, and 2,3-dimethyl-1,3-butadiene. It is preferable that the conjugated diolefin contain not more than 6 carbon atoms per molecule. In the preparation of low molecular weight polymers, 1,3-butadiene, or a related diolefin, such as previously mentioned, is polymerized alone or with a monomer copolymerizable therewith, with the butadiene comprising the major polymerizable ingredient and being present in an amount which exceeds 50 per cent by weight of the monomeric material. Comonomers include vinyl compounds, such as styrene, methyl substituted styrene, and the like, as well as conjugated diolefins, such as isoprene, piperylene, 2,3-dimethyl-1,3-butadiene, and the like. While the polymers may be prepared by any method which will yield a liquid product, mass polymerization is generally preferred. When mass polymerization methods are employed, liquid products are readily obtained by controlling the temperature, pressure, amount of catalyst, kind and amount of solvent, and the like, with no additional materials being necessary to regulate the viscosity. If desired, the liquid polymers may be prepared by emulsion polymerization but in such cases it is necessary to employ modifiers in order to obtain a product of the viscosity desired. Though mass polymerization and emulsion polymerization techniques are well known in the art the following mass polymerization procedure, for example, may be employed for making the polymer material to be used in preparing the vulcanizable composition of the present invention. Butadiene is polymerized in the presence of finely divided metallic sodium as a catalyst, the amount of sodium used usually falls within the range of 4 to 10 parts by weight per 100 parts by weight of butadiene. A diluent, such as butane, may be used if desired. The polymerization temperature is held within the range of 80 to 120° C., and a pressure sufficient to maintain liquid phase in the reaction system is generally employed. The reaction time is within the range of 4 to 10 hours. After the polymerization reaction is completed the butadiene polymer is separated from unreacted butadiene and metallic sodium.

Rosin acids obtained from various sources, such as wood rosins and gum rosins, are applicable in this invention. Also, the disproportionated acids derived from rosin, such as abietic acid, dehydroabietc acid, dihydroabietic acid, tetrahydroabietic acid, and mixtures of these acids, may be employed.

As hereinbefore mentioned, the butadiene polymers employed in the preparation of the vulcanizable plasticizer compositions of this invention are low molecular weight or liquid polymers. The viscosty of these materials may vary within wide limits but usually ranges between 1,000 and 30,000 Saybolt Universal seconds at 100° F. However, any butadiene polymer of low molecular weight, that is, a liquid polymer, is applicable in this invention.

In the vulcanizable plasticizer compositions herein described, the proportion of rosin acid to butadiene polymer may vary over a broad range but will usually not exceed a 1:1 ratio, and usually the ratio in the range of 0.3 to 1.0 part polymer per part rosin acid by weight is preferred. No definite limits can be set, however, since the proportions of ingredients will be governed by the rubber sample in which the composition is incorporated as well as the properties desired in the product. A composition that will flow is generally preferred to one of the more viscous type. The liquid polymer and rosin acid may be admixed or reacted in any suitable manner to form the vulcanizable composition, but it is preferred to agitate them in a suitable manner maintained at a temperature in the range of about 20 to 80° C. for a period of 5 minutes to 1 hour, or until a homogeneous product is obtained. Applicant does not wish to be bound by any specific theory concerning the mechanism of the formation of his novel plasticizer composition. However, it is possible that a chemical reaction takes place between these two reactants and that one or more definite chemical compounds are thus formed.

The amount of plasticizer composition employed for a given processing operation is governed by the type of rubber to be processed and the results desired. Usually, however, it is desirable to use 5 to 40 parts by weight of the preferred polymer-rosin acid composition to 100 parts by weight of the rubber or rubber-like material to be processed.

As hereinbefore stated, the compositions of this invention are applicable when processing both natural and synthetic rubber stocks and numerous advantages have been presented. These advantages are illustrated further in the examples, which should not be interpreted in any way to unnecessarily limit the invention.

EXAMPLE I

A composition was prepared comprising two parts by weight of sodium polymerized liquid polybutadiene admixed with one part by weight of rosin acid and the resulting mixture agitated at about 25° C. for about 30 minutes. This resulting material was used in the compounding recipes of Table I in which natural rubber was employed. A control recipe using asphalt softener is also included. The quantities are given as parts by weight.

Table I

| | I | II | Control |
|---|---|---|---|
| Natural rubber | 100 | 88 | 100 |
| Carbon black | 50 | 50 | 50 |
| Zinc oxide | 4 | 4 | 4 |
| Polybutadiene-rosin acid composition | 9 | 18 | |
| Asphalt softener | | | 6 |
| Stearic acid | | | 3 |
| Sulfur | 2 | 2 | 2 |
| N-cyclohexyl-2-benzothiazolesulfenamide | 0.4 | 0.4 | 0.4 |
| Phenyl-beta-naphthylamine | 1.5 | 1.5 | 1.5 |

Stearic acid activator was included in the control recipe to supply acid comparable in amount to the rosin acid in the vulcanizable plasticizer composition used in recipe I. The polybutadiene-rosin acid composition incorporated into the rubber samples very rapidly. Curing was effected at 307° F. Tests were made on all samples at equal states of cure as determined by compression set data. The polybutadiene-rosin acid composition exhibited a pronounced plasticizing action, retarded the rate of cure, and improved the scorch properties. On account of its softening action the hardness of the stock was decreased. Improvements were also realized in abrasion resistance. The results shown in Table II were obtained.

Table II

| | I | II | Control |
|---|---|---|---|
| Unaged Samples: | | | |
| Minutes to cure to 18% compression set | 40 | 40 | 29 |
| Compounded Mooney, MS 1½ | 31 | 27 | 35.5 |
| Shore hardness | 50 | 50 | 60 |
| Abrasion loss, cc. (35 minute cure) | 3.22 | 3.68 | 3.98 |
| Minutes to scorch at 250° F | 16 | 18 | 10 |
| Oven Aged 24 Hours at 212° F.: | | | |
| Shore hardness | 54 | 54 | 62 |
| Abrasion loss, cc. (35 minute cure) | 4.26 | 3.90 | 5.67 |

EXAMPLE II

Three runs were made to determine the effect of stearic acid on the rate of cure and also on the scorch properties when included in a compounding recipe using a polybutadiene-rosin acid composition as the softener. In two runs the compounding recipe I of Example I was used, one without stearic acid and the other with 3.0 parts by weight of this additive, but each containing 9.0 parts by weight of the polybutadiene-rosin acid composition. A run was also made using the control recipe of Example I in which 6.0 parts by weight of an asphalt softener and 3.0 parts by weight of stearic acid were employed. The rate of cure is shown by compression set data, an activating effect being obtained in the samples containing the stearic acid. When stearic acid is present, the curing rate with the polybutadiene-rosin acid softener is similar to what is obtained with the asphalt softener but a noticeable difference is observed in scorch properties, the former serving as a scorch retarder. The data are shown in Table III, with runs being designated as follows: run I, 9.0 parts by weight polybutadiene-rosin acid composition, no stearic acid; run II, 9.0 parts by weight polybutadiene-rosin acid composition, 3 parts by weight stearic acid; run III, 6.0 parts by weight asphalt softener, 3 parts by weight stearic acid (control).

Table III

| Run No. | Percent Compression Set Minutes Cure at 307° F. | | | | | Minutes to scorch 250° F. |
|---|---|---|---|---|---|---|
| | 10 | 20 | 30 | 45 | 75 | |
| I | 59.8 | 36.0 | 25.1 | 16.1 | 11.2 | 16 |
| II | 52.9 | 30.4 | 19.7 | 11.9 | 8.1 | 17 |
| III (Control) | 52.1 | 29.8 | 17.2 | 10.3 | 7.2 | 10 |

EXAMPLE III

The liquid polybutadiene-rosin acid composition of Example I was compounded with natural rubber according to the recipe in Table IV (designated as I) and the resulting sample evaluated. A similar evaluation was made substituting an asphalt softener for the polybutadiene-rosin acid composition (designated as II in Table IV). The quantities are given as parts by weight.

Table IV

| | I | II |
|---|---|---|
| Natural rubber | 100 | 100 |
| Carbon Black | 50 | 50 |
| Zinc oxide | 4 | 4 |
| Stearic acid | 3 | 3 |
| Sulfur | 2 | 2 |
| N-cyclohexyl-2-benzothiazole-sulfenamide | 0.4 | 0.4 |
| Phenyl-beta-napthylamine | 1.5 | 1.5 |
| Polybutadiene-rosin acid composition | 6 | |
| Asphalt softener | | 6 |

Curing was effected at 307° F. Tests were made on samples at equal states of cure, as determined by compression set data. The polybutadiene-rosin acid composition exhibited a greater plasticizing effect than the asphalt softener and showed improvements in hysteresis properties and abrasion resistance. The data are herewith presented in Table V.

Table V

|  | I | II |
|---|---|---|
| Unaged Samples: |  |  |
| Minutes to cure to 17.5+ compression set | 28 | 35 |
| Compounded Mooney, MS 1½ | 36 | 39 |
| Hysteresis, ΔT, ° F. (30 minute cure) | 39.8 | 46.5 |
| Resilience, percent | 73.7 | 69.4 |
| Abrasion loss, grams (30 minute cure) | 4.72 | 6.02 |
| Flex life, percent broken at 50,000 flexures | 8 | 12 |
| Oven Aged 24 Hours at 212° F.: |  |  |
| Hysteresis, ΔT, ° F. (30 minute cure) | 44.5 | 47.6 |
| Resilience, percent | 74.4 | 70.5 |
| Abrasion loss, grams (30 minute cure) | 5.84 | 6.54 |

EXAMPLE IV

A sample of 100 parts by weight butadiene-styrene copolymer prepared by emulsion polymerization at 41° F. and having a Mooney value of 100 (ML4) was compounded according to the recipe given in Table VI using 9 parts by weight of the liquid polybutadiene-rosin acid composition described in Example I. For purposes of comparison a control sample was run using 9 parts by weight of asphalt softener in place of the polybutadiene-rosin acid composition.

Table VI

| | Parts by weight |
|---|---|
| Butadiene-styrene copolymer | 100 |
| Carbon black | 50 |
| Zinc oxide | 3 |
| Polybutadiene-rosin acid composition | 9 |
| Sulfur | 1.75 |
| N-cyclohexyl-2-benzothiazolesulfenamide | 0.95 |

Curing was effected at 307° F. Tests were made on the samples at equal states of cure as determined by compression set data. Results of the tests are shown in Table VII. The polybutadiene-rosin acid composition exhibited excellent plasticizing properties, as evidenced by the compounded Mooney value (MS 1½). Samples containing this softener also showed improved resilience and abrasion resistance and bonded well on the mill.

Table VII

|  | Sample Containing Polybutadiene-Rosin Acid | Control |
|---|---|---|
| Unaged Samples: |  |  |
| Minutes cure to 18 percent compression set | 30 | 28 |
| Compounded Mooney, MS 1½ | 55.5 | 67.5 |
| Resilience, Percent | 63.5 | 61.8 |
| Abrasion loss, cc. (35 minute cure) | 2.11 | 2.36 |
| Oven Aged 24 Hours at 212° F.: |  |  |
| Resilience, Percent | 68.3 | 67.4 |
| Abrasion loss, cc. (35 minute cure) | 1.74 | 2.55 |

EXAMPLE V

Two recipes were employed for compounding samples of a butadiene-styrene copolymer prepared by emulsion polymerization at 41° F. The polymer, prior to compounding, had a Mooney value of 64 (ML4). In one case the liquid polybutadiene-rosin acid composition described in Example I was employed as the softener while in the other case an asphalt softener was used. The compounding recipes are presented in Table VIII, the quantities being given as parts by weight.

Table VIII

|  | Polybutadiene-Rosin Acid Softener | Asphalt Softener |
|---|---|---|
| Butadiene-styrene copolymer | 100 | 100 |
| Carbon black | 50 | 50 |
| Softener | 10 | 10 |
| Zinc oxide | 3 | 3 |
| Stearic acid | 1 | 1 |
| Sulfur | 1.75 | 1.75 |
| N-cyclohexyl-2-benzothiazolesulfenamide | 0.95 | 0.95 |

The samples were cured 30 minutes at 307° F. The data contained in Table IX were obtained.

Table IX

|  | Polybutadiene-Rosin Acid Softener | Asphalt Softener |
|---|---|---|
| Unaged Samples: |  |  |
| Compounded Mooney, MS 1½ | 42 | 50.5 |
| Stress-strain properties at 80° F.— |  |  |
| 300 percent modulus, p. s. i. | 1,030 | 1,140 |
| Tensile, p. s. i. | 3,460 | 3,550 |
| Elongation, Percent | 675 | 675 |
| Stress-strain properties at 200° F.— |  |  |
| Tensile, p. s. i. | 2,120 | 2,000 |
| Elongation, percent | 425 | 475 |
| Resilience, percent | 55.0 | 54.0 |
| Flex life at 210° F., thousands of flexures to failure | 16.9 | 43.8 |
| Abrasion loss, grams (35 minute cure) | 2.56 | 2.81 |
| Oven Aged 24 Hours at 212° F.: |  |  |
| Stress-strain properties at 80° F.— |  |  |
| 300 percent modulus, p. s. i. | 2,110 | 2,090 |
| Tensile, p. s. i. | 4,130 | 3,460 |
| Elongation, percent | 500 | 460 |
| Resilience, percent | 60.2 | 60.0 |
| Flex life at 210° F., thousands of flexures to failure | 13.5 | 8.9 |
| Abrasion loss, grams (35 minute cure) | 2.56 | 3.58 |

The vulcanizable softener (polybutadiene-rosin acid composition) showed much greater plasticizing effects than the asphalt softener as evidenced by the decrease in Mooney values upon compounding. The retention of flex life on oven aging is particularly noteworthy, the sample containing the vulcanizable softener showing about an 80 per cent retention of flex life while a value of only around 20 per cent was shown with the sample containing the asphalt softener.

It is to be understood that this invention should not be unnecessarily limited to the above discussion and description and that modifications and variations may be made without departing from the invention or from the scope of the claims.

I claim:

1. A method for producing rubber processing compositions to be used in the vulcanization of rubber to improve their processability and the properties of the finished product, which comprises admixing one part by weight of a liquid polymer of a conjugated diolefin containing not more than 6 carbon atoms per molecule with 0.3 to 1 part by weight of a rosin acid and admixing at least 5 parts by weight of the resulting composition with 100 parts by weight of said rubber prior to vulcanization.

2. A method for producing rubber processing compositions to be used in the vulcanization of a rubber-like material to improve the processability of said rubber-like material and the properties of the finished product, which comprises incorporating one part by weight of a liquid polymer of a conjugated diolefin containing not more than 6 carbon atoms per molecule having a viscosity in the range between 1,000 and 30,000 Saybolt Universal seconds at 100° F. with 0.3 to 1 part by weight of a rosin acid, and admixing 5 to 40 parts by weight of the resulting product with 100 parts by weight of said rubber-like material prior to vulcanization of said rubber-like material.

3. A method of claim 2 in which the rosin acid is abietic acid.

4. A method of claim 2 in which the rosin acid is dehydroabietic acid.

5. A method of claim 2 in which the rosin acid is tetrahydroabietic acid.

6. A method for producing rubber processing compositions to be used in the vulcanization of a synthetic rubber to improve the processability of said rubber and the properties of the finished product, which comprises admixing one part by weight of a liquid polymer of 1,3-butadiene having a viscosity in the range between 1,000 and 30,000 Saybolt Universal seconds at 100° F. with 0.3 to 1 part by weight of a rosin acid at a temperature in the range of 20 to 80° C. and admixing 5 to 40 parts by weight of the resulting product with 100 parts by weight of said rubber prior to vulcanization.

7. A method for producing rubber processing compositions to be used in the vulcanization of rubber to improve the processability of said rubber and the properties of the finished product, which comprises incorporating one part by weight of a liquid copolymer, prepared by copolymerization of a conjugated diolefin containing not more than 6 carbon atoms per molecule with a vinyl compound selected from the group consisting of styrene and methyl substituted styrene with 0.3 to 1 part by weight of a rosin acid and admixing 5 to 40 parts by weight of the resulting product with 100 parts by weight of said rubber prior to vulcanization of said rubber.

8. A method for producing plasticizer compositions for use in the vulcanization of a natural rubber material to improve the processability of said rubber material and the properties of the finished product, which comprises admixing one part by weight of a liquid butadiene polymer with 0.3 to 1 part by weight of a rosin acid, and admixing 5 to 40 parts by weight of the resulting product with 100 parts by weight of said rubber material prior to vulcanization.

9. A composition of claim 15 wherein the conjugated diolefin is 1,3-butadiene and wherein said liquid polymer has a viscosity in the range between 1,000 and 30,000 Saybolt Universal seconds at 100° F.

10. A composition comprising (a) 100 parts by weight of rubber, (b) 5 to 40 parts by weight of a composition resulting from admixing one part by weight of a liquid sodium-catalyzed polymer of 1,3-butadiene with 0.3 to 1 part by weight of a rosin acid, the said liquid sodium-catalyzed polymer being in an amount sufficient to disperse said rosin acid, and (c) vulcanizing ingredients.

11. A vulcanized composition prepared by vulcanizing a mixture of (a) 100 parts by weight of a rubber-like material and (b) 5 to 40 parts by weight of the product resulting from the admixture of one part by weight of a liquid polymer of a conjugated diolefin having not more than 6 carbon atoms per molecule and 0.3 to 1 part by weight of a rosin acid, the said liquid polymer being in an amount to disperse said rosin acid and the said product resulting from said admixture being in an amount sufficient to increase the time of scorch and to reduce the abrasion loss of said vulcanized composition.

12. A rubber composition comprising (a) 100 parts by weight of a rubber and (b) 5 to 40 parts by weight of the composition resulting from the admixture of one part by weight of a liquid polymer of a conjugated diolefin having not more than 6 carbon atoms per molecule with 0.3 to 1 part of rosin acid.

13. A vulcanized composition prepared by vulcanizing a mixture of (a) 100 parts by weight of a rubber-like material and (b) 5 to 40 parts by weight of the composition resulting from the admixture of 1 part by weight of a liquid polymer of a conjugated diolefin having not more than 6 carbon atoms per molecule and 0.3 to 1 part by weight of a rosin acid.

14. The composition of claim 12 wherein the conjugated diolefin is 1,3-butadiene.

15. A rubber composition comprising (a) 100 parts by weight of rubber and (b) 5 to 40 parts by weight of a composition resulting from admixing one part by weight of a liquid polymer of a conjugated diolefin having not more than 6 carbon atoms per molecule with 0.3 to 1 part by weight of rosin acid.

16. A composition in accordance with claim 15 wherein said polymer is a liquid copolymer of butadiene and styrene.

References Cited in the file of this patent

UNITED STATES PATENTS

| | | |
|---|---|---|
| 2,012,259 | Denman | Aug. 27, 1935 |
| 2,377,647 | Pragoff | June 5, 1945 |
| 2,384,683 | Kistler | Sept. 11, 1945 |
| 2,473,538 | McIntire | June 22, 1949 |

FOREIGN PATENTS

| | | |
|---|---|---|
| 492,998 | Great Britain | Sept. 30, 1938 |